US011330079B2

(12) United States Patent
Ritter (10) Patent No.: US 11,330,079 B2
(45) Date of Patent: May 10, 2022

(54) ENVIRONMENT FOR DEVELOPING OF DISTRIBUTED MULTICLOUD APPLICATIONS

(71) Applicant: SAP SE, Walldorf (DE)

(72) Inventor: Daniel Ritter, Heidelberg (DE)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 16/737,020

(22) Filed: Jan. 8, 2020

(65) Prior Publication Data

US 2021/0211520 A1 Jul. 8, 2021

(51) Int. Cl.
| | | |
|---|---|---|
| H04L 29/08 | (2006.01) | |
| G06F 9/50 | (2006.01) | |
| G06F 16/13 | (2019.01) | |
| G06F 16/178 | (2019.01) | |
| H04L 67/00 | (2022.01) | |
| H04L 67/1097 | (2022.01) | |
| H04L 67/12 | (2022.01) | |
| H04L 67/025 | (2022.01) | |

(52) U.S. Cl.
CPC ............ *H04L 67/34* (2013.01); *G06F 9/5072* (2013.01); *G06F 16/137* (2019.01); *G06F 16/178* (2019.01); *H04L 67/025* (2013.01); *H04L 67/1097* (2013.01); *H04L 67/12* (2013.01)

(58) Field of Classification Search
CPC ..... H04L 67/34; H04L 67/1097; H04L 67/12; G06F 16/137; G06F 16/178
See application file for complete search history.

(56) References Cited

U.S. PATENT DOCUMENTS

| | | | | |
|---|---|---|---|---|
| 2007/0173328 | A1* | 7/2007 | Edgren | G06F 8/61 463/42 |
| 2012/0266156 | A1* | 10/2012 | Spivak | H04L 67/34 717/172 |
| 2013/0332916 | A1* | 12/2013 | Chinn | G06F 9/44 717/169 |
| 2016/0085769 | A1* | 3/2016 | Penangwala | G06F 16/137 707/610 |
| 2016/0110377 | A1* | 4/2016 | Yun | G06F 16/178 713/165 |
| 2016/0323382 | A1* | 11/2016 | Perreira | H04L 67/325 |
| 2020/0293658 | A1* | 9/2020 | Krishna Murthy | H04L 67/125 |

FOREIGN PATENT DOCUMENTS

EP 1936497 A2 * 6/2008 ............... G06F 8/61

* cited by examiner

*Primary Examiner* — Ario Etienne
*Assistant Examiner* — Kamal Hossain
(74) *Attorney, Agent, or Firm* — Sterne, Kessler, Goldstein & Fox P.L.L.C.

(57) ABSTRACT

Disclosed herein are system, method, and computer program product embodiments for distributing an application across multiple nodes. An embodiment operates by determining a first local state of a first bundle and a second local state of a second bundle, wherein the application comprises the first bundle and the second bundle. The embodiment calculates the first bundle is to be stored at a first node and the second bundle is to be stored at a second node based on a first level configuration file and a second level configuration file. The embodiment compares the first local state of the first bundle to a first remote state of the first node and the second local state of the second bundle to a second remote state of the second node. The embodiment then transmits the first bundle to the first node and the second bundle to the second node.

18 Claims, 6 Drawing Sheets

ENVIRONMENT FOR DEVELOPING OF DISTRIBUTED MULTICLOUD APPLICATIONS

BACKGROUND

Applications are increasingly being deployed across multiple nodes in different cloud computing environments (e.g., multiclouds). But updating an application deployed across multiple nodes is often slow and cumbersome. This is due to several reasons. First, making a change to the application often requires completely rebuilding a node assembly for a node. This can increase the wait time before the change is reflected in the deployed application. Second, making a change to the application often requires replacing the existing node assembly at a node with the completely rebuilt node assembly. This is often the case even if only a portion of the node assembly is changed. This can increase deployment time and increase application downtime. Third, there is often no way to automatically identify what changes to the application go to which nodes. Rather, a developer often must manually identify what parts of the application go to which nodes. Fourth, there is often no way to automatically build the application from multiple code repositories and deploy it to multiple nodes from a single entry point. Rather, a developer often must build the application from a single code repository and distribute the built parts to a single node at a time.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Provided herein are system, apparatus, device, method and/or computer program product embodiments, and/or combinations and sub-combinations thereof, for deploying an application across different nodes in one or more cloud computing environments (also referred to as "clouds").

Figure 1:
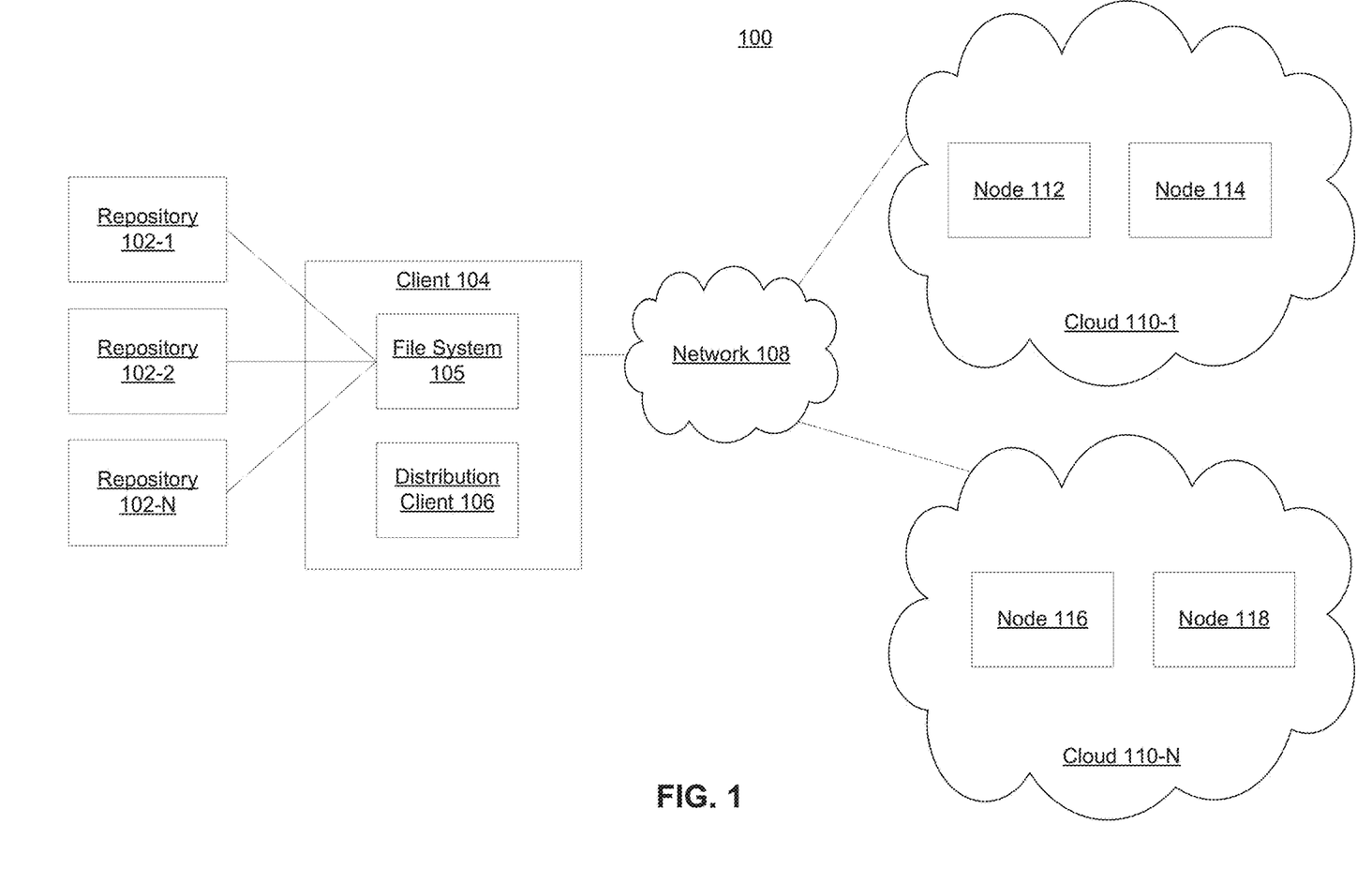
FIG. 1 is a block diagram of an environment for deploying an application across different nodes in one or more cloud computing environments, according to some embodiments.

FIG. 1 is a block diagram of an environment 100 for deploying an application across different nodes in one or more clouds, according to some embodiments. Environment 100 can include repositories 102-1 to 102-N, client 104, and clouds 110-1 to 110-N.

The application can be any type of application. The application can be broken up into pieces that are deployed across different nodes (e.g., nodes 112 and 114) in a single cloud (e.g., cloud 110-1). The application can also be broken up into pieces that are deployed across different nodes (e.g., nodes 112, 114, 116, and 118) in multiple clouds (e.g., clouds 110-1 to 110-N). A node can provide a remote execution environment. A piece of the application can run in the remote execution environment provided by the node. The remote execution environment provided by the node can be implemented using a virtual machine. The remote execution environment provided by the node can also be implemented using a container. As would be appreciated by a person of ordinary skill in the art, the remote execution environment provided by the node can be implemented using various other techniques.

The piece of the application running at a node can be referred to as a node assembly. A node assembly can be a collection of code and/or resources that implements part of the application. A node assembly can be designed to run on a particular type of node. The different node assemblies of the application can communicate with each other using messages thereby implementing the application.

The application deployed across different nodes often needs to be updated. For example, a developer may change the code to improve performance, fix a bug, or add a new feature, to name just some examples. Some solutions for deploying changes to an application deployed across different nodes involve rebuilding the node assemblies each time a change is made to the code making up the node assemblies. These solutions further involve a developer manually identifying the nodes that the rebuilt node assemblies are to be deployed to. Finally, these solutions involve replacing the existing node assemblies at the nodes with the rebuilt node assemblies even in the case of minor code changes. These solutions can suffer from a significant time delay between making a change to the code and that change actually being reflected in the deployed application in the cloud. Moreover, these solutions are often cumbersome and error prone.

To solve these and other technological problems and challenges, client 104 can include a distribution client 106 that interacts with a distribution server at each node running the application. Distribution client 106 can automatically identify where different pieces of the application are to be deployed using a series of hierarchical configuration files. Distribution client 106 can also interact with the distribution server to identify changed portions of a node assembly at a node. The distribution server can then replace just the changed portions of the node assembly.

In FIG. 1, client 104 can be a computer system at a business's, organization's, or other entity's premises. Client 104 can be any of a server computer, computer cluster, desktop workstation, laptop or notebook computer, netbook, tablet, personal digital assistant (PDA), smart phone, smart watch or other wearable, appliance, part of the Internet-of-Things, and/or embedded system, to name a few non-limiting examples, or any combination thereof.

Client 104 can include file system 105. Client 104 can mount files in repositories 102-1 to 102-N into file system 105. A repository 102 can contain files for building the application. Different repositories 102 can contain different files for the application. The use of different repositories 102 can enable multiple developers to simultaneously build different pieces of the application.

A repository 102 can be a computer system at a business's, organization's, or other entity's premises, to name just some examples. A repository 102 can be any of a server computer, computer cluster, desktop workstation, laptop or notebook computer, netbook, tablet, personal digital assistant (PDA), smart phone, smart watch or other wearable, appliance, part of the Internet-of-Things, and/or embedded system, to name a few non-limiting examples, or any combination thereof.

Client 104 can compile and link the mounted files in file system 105 to build pieces of the application. Distribution client 106 can deploy the pieces of the application to different nodes (e.g., nodes 112 to 118) in one or more clouds (e.g., clouds 110-1 to 110-N). Distribution client 106 can deploy the pieces of the application to the different nodes over network 108. Network 108 can include, without limitation, wired and/or wireless intranet, extranet, Internet, cellular, Bluetooth and/or any other local, short range, ad hoc, regional, global communications network, as well as any combination thereof.

To reduce the time delay between making a change to the code and that change actually being reflected in the deployed application, distribution client 106 can update node assemblies at different nodes using bundles. A node assembly can be made up of one or more bundles. A bundle can be a set of code and or resources that can be updated independent of other bundles in the node assembly. A bundle can be a software module or component with cohesive functionality. In other words, a bundle can represent a set of interdependent code and or resources. Distribution client 106 can update node assemblies at different nodes by identifying and replacing just the changed bundles of the node assemblies. This can reduce the deployment time of changes to the application as well as application downtime.

Figure 2:
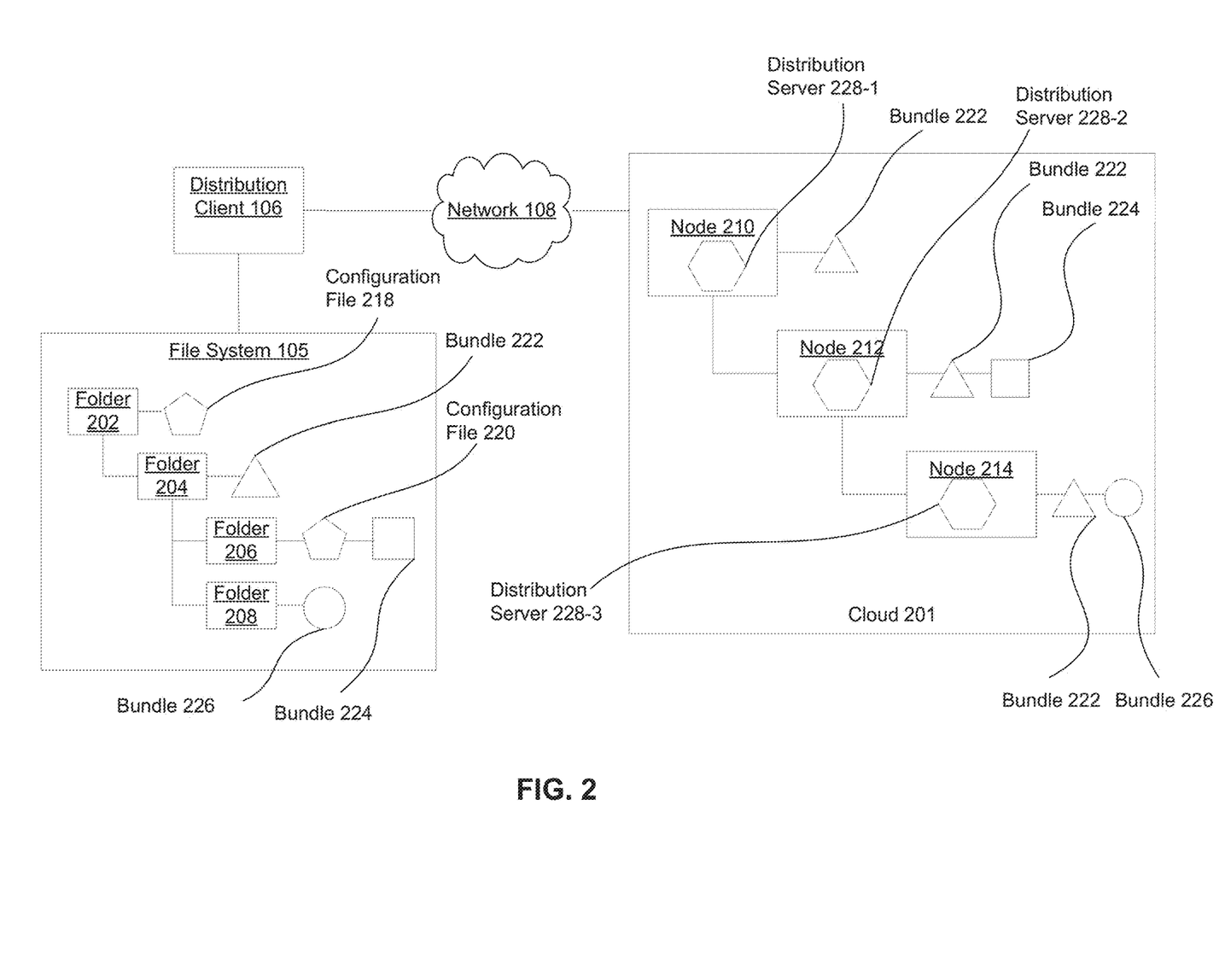
FIG. 2 is a block diagram illustrating the use of a distribution client to automatically identify changes to parts of an application and deploying those changes to relevant nodes that need them, according to some embodiments.

FIG. 2 is a block diagram illustrating the use of distribution client 106 to automatically identify changes to parts of the application and deploying those changes to relevant nodes that need them, according to some embodiments. FIG. 2 is described with reference to FIG. 1.

In FIG. 2, the application is deployed in cloud 201 across nodes 210, 212, and 214. Nodes 210, 212, and 214 can run different parts of the application. The node assemblies at nodes 210, 212, and 214 are made up of different bundles. Distribution client 106 can automatically update the bundles at nodes 210, 212, and 214. This can involve two steps. First, distribution client 106 can identify what bundles go to what nodes. Second, distribution client 106 can determine what bundles are out of date at those nodes. Distribution client 106 can perform this determination by connecting to a distribution server 228 at each node. Thus, distribution client 106 can provide a single point of entry to a developer for building and deploying an application across multiple nodes with minimal waiting time as well as downtime for the application.

Distribution client 106 can communicate with a distribution server 228 at each node through an extendible set of commands. For example, distribution client 106 can transmit a command to a distribution server 228 which dispatches the command to an appropriate action handler that perform an appropriate action at the node. Thus, distribution client 106 can provide a single of point of entry to a developer for interacting with an application deployed across multiple nodes.

Because distribution client 106 can provide a single of point of entry for interacting with an application deployed across multiple nodes, distribution client 106 can be used to trigger application lifecycle actions at the multiple nodes. For example, distribution client 106 can perform updates to the node assemblies at the multiple nodes. However, distribution client 106 can also be used to trigger various other actions at the multiple nodes including, but not limited to, debugging, logging, tracing, usage analysis, health analysis, and updating of the distribution servers 228 themselves.

Distribution client 106 can access file system 105. File system 105 can mount files from a plurality of repositories 102 into a single hierarchical folder structure. This can enable distribution client 106 to consider all (or a subset of) the source code files needed to build and deploy the application across nodes 210, 212, and 214.

After a developer makes one or more changes to code and or resource files in repositories 102, a developer can build local copies of the bundles that make up the application. In FIG. 2, the developer can build local copies of one or more of bundles 222, 224, and 226. As would be appreciated by a person of ordinary skill in the art, a developer can build local copies of bundles 222, 224, and 226 using various compilation, linking, and source code management tools.

After building bundles 222, 224, and 226, distribution client 106 can determine which bundles go to which nodes (e.g., nodes 210, 212, and 214). Distribution client 106 can further determine which bundles are out of date at the nodes (e.g., nodes 210, 212, and 214).

Distribution client 106 can determine which bundles go to which nodes using one or more configuration files (e.g., configuration files 218 and 220) stored in file system 105. Distribution client 106 can process the one or more configuration files starting from the highest level configuration file (e.g., configuration file 218) in the hierarchical tree of file system 105 to the lowest level configuration file (e.g., configuration file 220) in the hierarchical tree of file system 105. The highest level configuration file can specify one or more nodes for which to deploy bundles at its level or below in the hierarchical tree of file system 105. The lowest level configuration file can overrule the one or more nodes specified in the higher level configuration file for bundles at its level or below in the hierarchical tree of file system 105. Thus, lower level configuration files can overrule higher level configuration files. As would appreciated by a person of ordinary skill in the art, a configuration file can specify the one or more nodes for which to deploy bundles at its level or below in the hierarchical tree of file system 105 using various types of rules and conventions. Similarly, a configuration file can overrule the one or more nodes specified in a higher level configuration file using various types of rules and conventions.

For example, in FIG. 2, bundle 222 is stored in folder 204, bundle 224 is stored in folder 206, and bundle 226 is stored in folder 208. Bundle 222 may be intended to be deployed to nodes 210, 212, and 214. To accomplish this, configuration file 218 can be stored in folder 202 which can be the root folder of file system 105. Configuration file 218 can specify that bundles at or below folder 202 are to be stored at nodes 210, 212, and 214. This can cause distribution client 106 to deploy any bundles at or below folder 202 to nodes 210, 212, and 214.

Bundle 224 may be intended to be deployed only to node 212. But distribution client 106 may store bundle 224 at nodes 210, 212, and 214 using just configuration file 218. To avoid this behavior, distribution client 106 can override where bundle 224 is stored using configuration file 220. For example, configuration file 220 can exclude bundle 224 from nodes 210 and 214. This can cause distribution client 106 to store bundle 224 only at node 212. As would be appreciated by a person of ordinary skill in the art, a child configuration file (e.g., configuration file 220) can override (e.g., filter) where a parent configuration file (e.g., configuration file 218) is configured to store a bundle. A child configuration file (e.g., configuration file 220) can also specify additional nodes to store bundles starting at its level or below in the hierarchical tree of file system 105. Thus, configuration files can be overlapping or disjoint.

A configuration file can also specify multiple target groups of nodes (e.g., clusters or containers). This can enable distribution client 106 to distribute bundles to a given target group of nodes. For example, a developer can specify a target group to distribution client 106. Distribution client 106 can then use one or more configuration files to deploy bundles to that target group of nodes.

Figure 3:
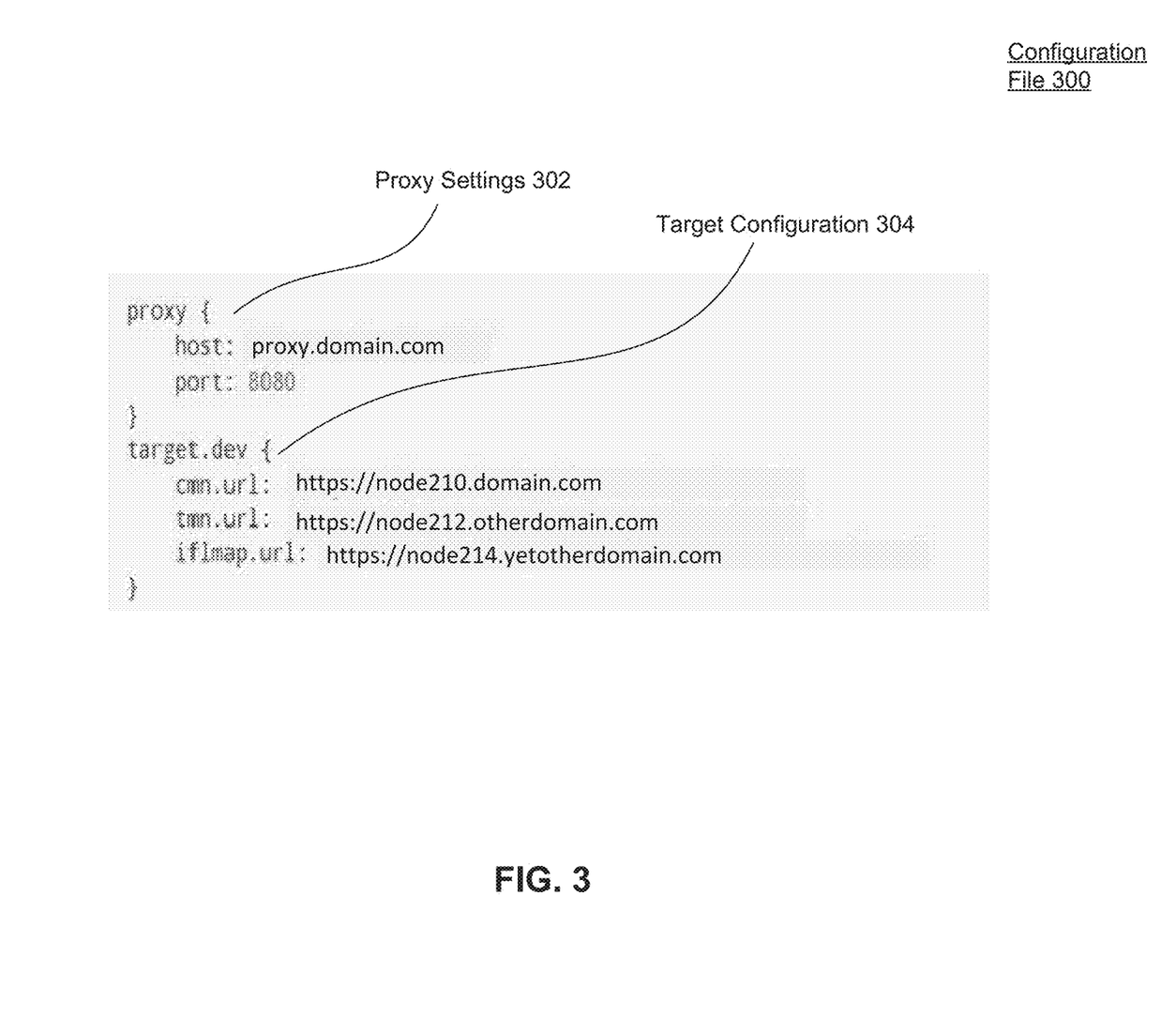
FIG. 3. is an example configuration file that a distribution client can use to identify what bundles should be distributed to what nodes, according to some embodiments.

FIG. 3 is an example of a configuration file 300 that distribution client 106 can use to identify what bundles should be distributed to what nodes, according to some embodiments. Configuration file 300 can include proxy setting 302 and one or more target configurations 304. FIG. 3 is described with reference to FIGS. 1 and 2.

Proxy setting 302 can specify the proxy server that distribution client 106 can use to communicate with a distribution server 228 at a relevant node. For example, in FIG. 3, distribution client 106 can communicate with a distribution server 228 through the proxy "proxy.domain.com" on port 8080.

Target configuration 304 can specify the nodes to receive bundles at or below the level of configuration file 300 in the hierarchical tree of file system 105 (unless filtered out by lower level configuration files). For example, target configuration 304 can specify that bundles at or below the level of configuration file 300 in the hierarchical tree of file system 105 can be deployed to node 210 (e.g., a central management node (CMN)), node 212 (e.g., a tenant management node (TMN)), and node 214 (e.g., an information flow map (IFLMAP) node) having uniform resource locators (URLs) of https://node210.domain.com, https://node212.otherdomain.com, and https://node214.yetotherdomain.com, respectively. As would be appreciated by a person of ordinary skill in the art, target configuration 304 can specify that bundles at or below the level of configuration file 300 in the hierarchical tree of file system 10 can be deployed to one or more nodes of any type that are arranged in any type of structural relationship including, but not limited to, a hierarchical relationship.

Configuration file 300 can also include multiple target configurations 304 (e.g., for different clusters or containers). Distribution client 106 can then deploy bundles to the group of nodes represented by each target configuration 304. A developer can specify a specific target configuration 304 for distribution client 106 to use. For example, the developer can specify that the "target.dev" target configuration 304 is to be used by distribution client 106. The developer can specify the target configuration 304 to use via a command line flag (e.g., "—target target.dev"). This can enable the developer to further filter bundles for specific destinations.

A developer can also specify particular nodes for distribution client 106 to deploy to. For example, a developer can specify "-t target.dev.cmn" to update just the CMN node in the "target.dev" target configuration 304. Thus, distribution client 106 can use configuration file 300 to automatically identity what nodes should receive what bundles. Moreover, a developer can specify a particular target configuration 304, or particular node, to further filter bundles to specific destinations.

Distribution client 106 can traverse the configuration files (e.g., configuration files 218 and 220) in the hierarchical tree of file system 105 to automatically identify what nodes should receive what bundles. But distribution client 106 can exclude deploying certain bundles to the identified nodes. This is because some bundles may not be ready for deployment (e.g., not added to the staged list). In addition, certain bundles may already be deployed and up to date at the relevant nodes.

First, distribution client 106 can exclude the deployment of bundles that a developer has indicated as not ready for deployment. Distribution client 106 can deploy bundles added to a staged list. The staged list can represent bundles that are capable of being deployed to relevant nodes. A developer can exclude the deployment of bundles by not adding them to the stage list. For example, the developer may not add a bundle to the staged list because changes still need to be made to the code files of the bundle.

Second, distribution client 106 may not want to deploy bundles that are not out of date at the relevant nodes. This can occur where another developer has already committed the current version of the bundle to the relevant nodes. To avoid unnecessarily updating a bundle at a node, distribution client 106 can perform an automatic difference calculation between the local states of the bundles (e.g., a staged bundle) and the remote statuses of the relevant nodes.

Distribution client 106 can calculate the differences by transmitting a status command to a distribution server 228 at each node that is part of a target configuration (e.g., determined from the one or more configuration files). In response, distribution client 106 can receive an indication or notification of what bundles changed locally. Moreover, distribution client 106 can receive a list of the specific differences between a particular bundle at a given node and the corresponding local bundle.

To perform the automatic difference calculation for a particular node, distribution client 106 can first identify all the bundles relevant to the particular node (e.g., through the traversal of configuration files such as configuration files 218 and 220). Distribution client 106 can then transmit a status command to a distribution server 228 at the particular node that includes a list of the local bundles associated with that particular node and the corresponding hashes for each bundle. Distribution client 106 can calculate the hashes using various hashing functions such as, but not limited to, Secure Hash Algorithm 1 (SHA-1) or Message Digest 5 (MD5). Distribution client 106 can transmit the status command to the distribution server 228 using various transport protocols including, but not limited to, WebSocket and Hypertext Transfer Protocol Secure (HTTPS).

In response, distribution server 228 can compare the list of local bundles to an index of bundles stored at the particular node. Distribution server 228 can determine whether a local bundle has already been deployed to the node by comparing the list of local bundles to the index of bundles stored at the node. Distribution server 228 can also determine whether a bundle at the node is out of date by comparing the received hash for the local bundle to the hash of the same bundle stored at the node. Distribution server 228 can then return a notification or list to distribution client 106 indicating bundles that are not present at the remote node or are out of date at the remote node.

For example, in FIG. 2, distribution client 106 can transmit a status command to distribution server 228-2 at node 212 that includes a list of the local bundles (e.g., bundles 222 and 224) and their associated hashes. In response, distribution server 228-2 can compare the list of local bundles to the index of bundles stored at node 212. Distribution server 228-2 can also compare the hashes of the local bundles to the hashes of the same bundles at node 212. Distribution server 228-2 can then return a notification or list to distribution client 106 indicating bundles that have not been installed, are unchanged, or are out of date at the remote node.

Distribution client 106 and distribution server 228 can also interact to perform more fine grained difference detection. For example, if distribution server 228 determines that a hash of a local bundle is different than a hash of the same bundle at its node, distribution server 228 can then compare the list of files in the local bundle to the list of files in the same bundle at its node. Distribution server 228 can then provide a response to distribution client 106 that indicates which files have been added, deleted, or changed in a given bundle.

Distribution server 228 can also determine whether one or more files in a local bundle are different than the same files in the corresponding bundle at its node. For example, distribution server 228 can determine whether one or more files in a local bundle are different than the same files in the corresponding bundle at its node based on file size. Distribution server 228 can also determine whether one or more files in a local bundle are different than the same files in the corresponding bundle at its node based on hashes of the files.

In response to detecting a difference between a file in a local bundle and the same file in the corresponding bundle at its node, distribution server 228 can perform a textual comparison between the file in the local bundle and the same file in the corresponding bundle at its node. Distribution server 228 can then provide a response to distribution client 106 that indicates the textual differences between the two files.

Distribution client 106 and distribution server 228 can interact to perform a multilevel automatic difference detection process to avoid unnecessary comparisons. For example, distribution client 106 and distribution server 228 can interact to first perform a comparison involving the hashes of the local bundles and the hashes of the same bundles at a particular node. This can ensure that unnecessary file list comparisons are not performed. If there are differences between the hashes, distribution client 106 and distribution server 228 can then interact to perform a comparison involving the list of files in a local bundle to the list of files in the same bundle at the particular node. If there are differences between two files, distribution client 106 and distribution server 228 can then interact to perform a textual comparison involving the file in the local bundle and the file in the same bundle at the particular node.

Distribution server 228 can also compare a local bundle to the same bundle at its node using version information. However, this may not be accurate in some cases. This is because the version information may not be updated when replacing a bundle at a node.

After checking the status, distribution client 106 can receive a notification or list of out of date bundles at different nodes. Distribution client 106 can display the list of out of date bundles together with the differences between the local bundles and the bundles at the different nodes. A developer can review these differences to determine which bundles should be allowed to updated. The developer can add these to be updated bundles to the staged list.

After finalizing the staged list, the distribution client 106 can transmit an update command to a distribution server 228 at each relevant node to update the bundles at the node with the changed local bundles. In response, distribution server 228 can replace just the changed bundles at its node. Thus, distribution server 228 can avoid the time consuming process of replacing the entire node assembly at its node.

Figure 4:
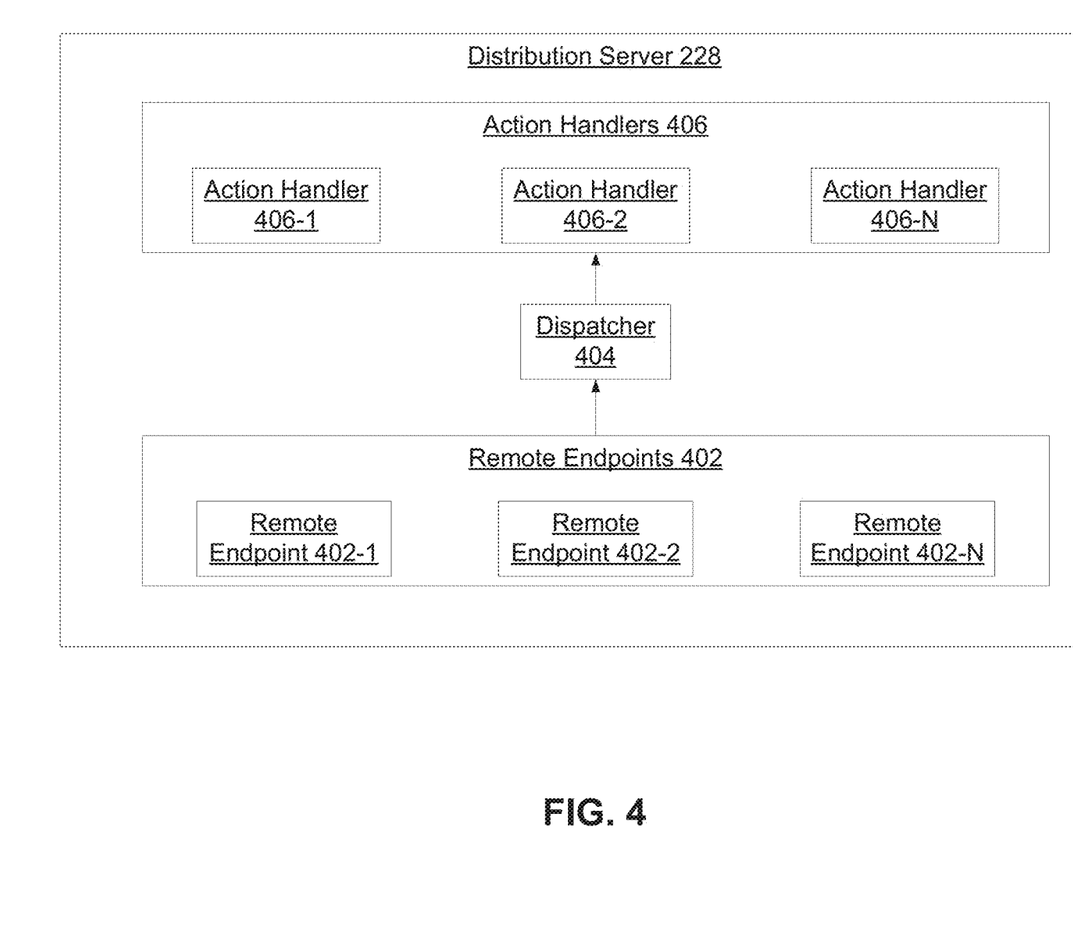
FIG. 4 is a block diagram of a distribution server at a node running a piece of an application that processes commands from a distribution client, according to some embodiments.

FIG. 4 is a block diagram of a distribution server 228 at a node running a piece of the application that processes commands from distribution client 106, according to some embodiments. FIG. 4 is described with reference to FIGS. 1 and 2.

Distribution server 228 can include remote endpoints 402, dispatcher 404, and action handlers 406. A remote endpoint 402 can represent an endpoint through which distribution client 106 can submit particular types of commands. For example, a remote endpoint 402 can handle application lifecycle commands (e.g., install bundle, update bundle, status of bundles). A remote endpoint 402 can handle application monitoring commands (e.g., debugging, logging, tracing). A remote endpoint 402 can handle application usage and health analysis commands. A remote endpoint 402 can also handle tool update commands to update the distribution server 228 itself.

In response to receiving a command (e.g., a status command), dispatcher 404 can dispatch the command to the appropriate action handler 406. The action handler 406 can then perform an action that is specific to the application. For example, the action handler 406 can perform an automatic difference calculation between a local bundle and a bundle on the node, or perform an update of a bundle on the node with a changed local bundle.

An action handler 406 can also perform an update of the distribution server 228 itself. This can involve distribution client 106 updating one or more bundles representing distribution server 228 with changed local bundles representing distribution server 228. This can enable a developer to automatically update distribution servers 228 at multiple nodes through a single point of entry (e.g., distribution client 106).

As would be appreciated by a person of ordinary skill in the art, a new remote endpoint 402 can be added to distribution server 228 to support processing new command types. Dispatcher 404 can then be updated to dispatch the new command types to newly added action handlers 406 that perform actions on the application that are specific to the new command types.

Figure 5:
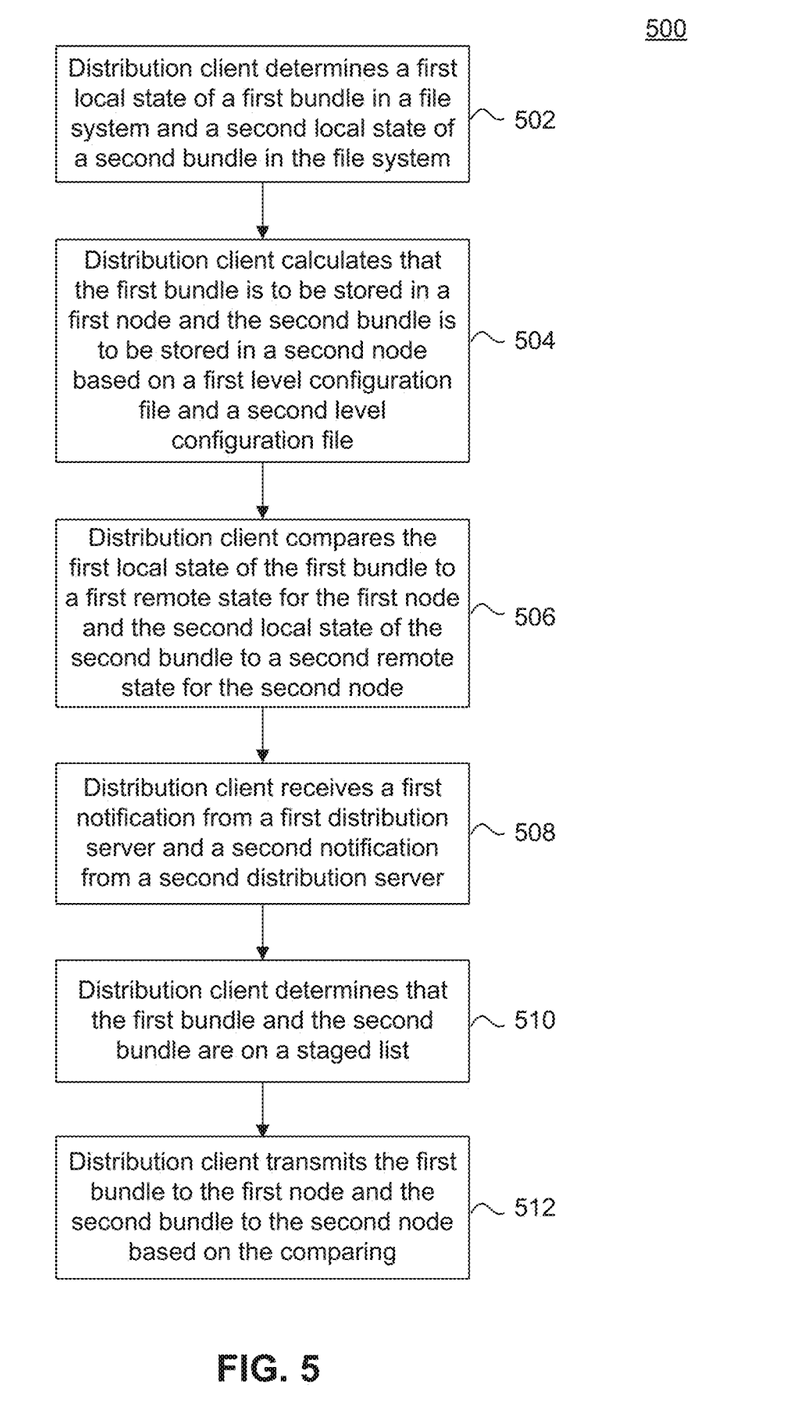
FIG. 5 is a flowchart illustrating a process for distributing an application across multiple nodes in one or more clouds, according to some embodiments.

FIG. 5 is a flowchart for a method 500 for distributing an application across multiple nodes in one or more clouds, according to an embodiment. Method 500 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 5, as will be understood by a person of ordinary skill in the art.

Method 500 shall be described with reference to FIGS. 1 and 2. However, method 500 is not limited to those example embodiments.

In 502, distribution client 106 determines a first local state of a first bundle in file system 105 and a second local state of a second bundle in file system 105. The first bundle and second bundle can make up the application running at the multiple nodes in the one or more clouds (e.g., clouds 110-1 to 110-N). The first bundle can be stored in first repository 102. The second bundle can be stored in second repository 102. The first bundle can comprise a first set of interdependent code. The second bundle can comprise a second set of interdependent code.

Distribution client 106 can calculate the first local state of the first bundle by generating a hash of the first bundle.

Distribution client 106 can calculate the hash using various hashing functions such as, but not limited to, SHA-1 or MD5. Distribution client 106 can also calculate the first local state of the first bundle by determining a list of files in the first bundle. Distribution client 106 can also calculate the first local state of the first bundle by determining a version number of the first bundle.

In 504, distribution client 106 calculates that the first bundle is to be stored in a first node in a first cloud (e.g., cloud 110-1) and the second bundle is to be stored in a second node in a second cloud based on a first level configuration file and a second level configuration file.

Distribution client 106 can calculate that the first bundle is to be stored at the first node in the first cloud based on the first level configuration file. Distribution client 106 can calculate that the second bundle is to be stored at the second node in the second cloud based on the first level configuration file and the second level configuration file. This can involve distribution client 106 overriding (e.g., filtering) where the first configuration file is configured to store the second bundle based on the second level configuration file.

In 506, distribution client 106 compares the first local state of the first bundle to a first remote state for the first node and the second local state of the second bundle to a second remote state for the second node. Distribution client 106 can compare the first local state of the first bundle to the first remote state for the first node by transmitting a first command comprising the first local state of the first bundle to a first distribution server 228 at the first node. Similarly, distribution client 106 can compare the second local state of the second bundle to the second remote state for the second node by transmitting a second command comprising the second local state of the second bundle to a second distribution server 228 at the second node.

In 508, distribution client 106 receives a first notification from a first distribution server 228 indicating that the first local state of the first bundle is different than the first remote state for the first node. Similarly, distribution client 106 receives a second notification from a second distribution server 228 indicating that the second local state of the second bundle is different than the second remote state for the second node.

In 510, distribution client 106 determines that the first bundle and the second bundle are on a staged list. The staged list can represent bundles that are capable of being deployed to relevant nodes.

In 512, distribution client 106 transmits the first bundle to the first node and the second bundle to the second node based on the comparing in 506. In some embodiments, distribution client 106 can transmit the first bundle to the first node and the second bundle to the second node based on a schedule. For example, distribution client 106 can transmit the first bundle to the first node at low usage times for the first node.

Figure 6:
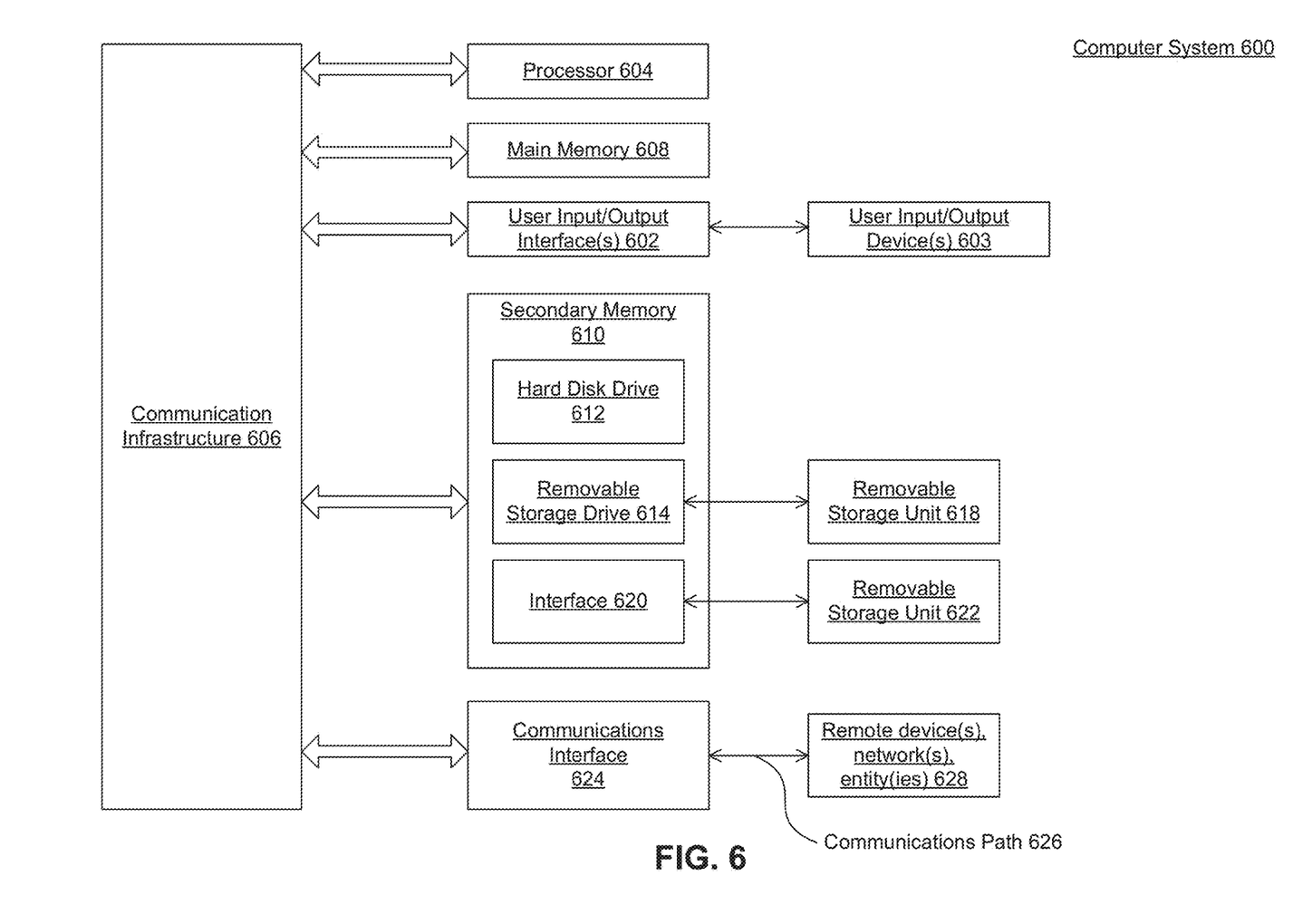
FIG. 6 is an example computer system useful for implementing various embodiments.

Various embodiments can be implemented, for example, using one or more computer systems, such as computer system 600 shown in FIG. 6. Computer system 600 can be used, for example, to implement method 500 of FIG. 5. For example, computer system 600 can distribute an application across multiple nodes in one or more clouds. Computer system 600 can be any computer capable of performing the functions described herein.

Computer system 600 can be any well-known computer capable of performing the functions described herein.

Computer system 600 includes one or more processors (also called central processing units, or CPUs), such as a processor 604. Processor 604 is connected to a communication infrastructure or bus 606.

One or more processors 604 may each be a graphics processing unit (GPU). In an embodiment, a GPU is a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 600 also includes user input/output device(s) 603, such as monitors, keyboards, pointing devices, etc., that communicate with communication infrastructure 606 through user input/output interface(s) 602.

Computer system 600 also includes a main or primary memory 608, such as random access memory (RAM). Main memory 608 may include one or more levels of cache. Main memory 608 has stored therein control logic (i.e., computer software) and/or data.

Computer system 600 may also include one or more secondary storage devices or memory 610. Secondary memory 610 may include, for example, a hard disk drive 612 and/or a removable storage device or drive 614. Removable storage drive 614 may be a floppy disk drive, a magnetic tape drive, a compact disk drive, an optical storage device, tape backup device, and/or any other storage device/drive.

Removable storage drive 614 may interact with a removable storage unit 618. Removable storage unit 618 includes a computer usable or readable storage device having stored thereon computer software (control logic) and/or data. Removable storage unit 618 may be a floppy disk, magnetic tape, compact disk, DVD, optical storage disk, and/any other computer data storage device. Removable storage drive 614 reads from and/or writes to removable storage unit 618 in a well-known manner.

According to an exemplary embodiment, secondary memory 610 may include other means, instrumentalities or other approaches for allowing computer programs and/or other instructions and/or data to be accessed by computer system 600. Such means, instrumentalities or other approaches may include, for example, a removable storage unit 622 and an interface 620. Examples of the removable storage unit 622 and the interface 620 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 600 may further include a communication or network interface 624. Communication interface 624 enables computer system 600 to communicate and interact with any combination of remote devices, remote networks, remote entities, etc. (individually and collectively referenced by reference number 628). For example, communication interface 624 may allow computer system 600 to communicate with remote devices 628 over communications path 626, which may be wired and/or wireless, and which may include any combination of LANs, WANs, the Internet, etc. Control logic and/or data may be transmitted to and from computer system 600 via communication path 626.

In an embodiment, a tangible, non-transitory apparatus or article of manufacture comprising a tangible, non-transitory computer useable or readable medium having control logic (software) stored thereon is also referred to herein as a computer program product or program storage device. This includes, but is not limited to, computer system 600, main memory 608, secondary memory 610, and removable storage units 618 and 622, as well as tangible articles of manufacture embodying any combination of the foregoing. Such control logic, when executed by one or more data processing devices (such as computer system 600), causes such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 6. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A computer implemented method for distributing an application across multiple nodes, comprising:

determining, by at least one processor at a distribution client, a first local state of a first bundle in a file system and a second local state of a second bundle in the file system, wherein the application comprises the first bundle and the second bundle, and the first bundle is stored in a first repository and the second bundle is stored in a second repository;

calculating, by the at least one processor, the first bundle is to be stored at a first node in a first cloud computing environment and the second bundle is to be stored at a second node in a second cloud computing environment based on a first level configuration file and a second level configuration file, wherein the first level configuration file is stored in the file system at a higher hierarchical level than the second level configuration file is stored in the file system;

transmitting, by the at least one processor, a first status command to a first remote endpoint of a first distribution server at the first node and a second status command to a second distribution server at the second node, wherein the first remote endpoint handles a command type of the first status command, the first status command causes the first distribution server to perform an automatic difference calculation between the first local state of the first bundle and a first remote state at the first node, and the first status command comprises the first local state of the first bundle, and the second status command comprises the second local state of the second bundle;

in response to the transmitting, receiving, by the at least one processor, a first notification from the first distribution server at the first node and a second notification from the second distribution server at the second node, wherein the first notification indicates that the first distribution server determined the first local state of the first bundle is different than the first remote state at the first node, and the second notification indicates that the second distribution server determined the second local state of the second bundle is different than a second remote state at the second node; and transmitting, by the at least one processor, a first update command to a second remote endpoint of the first distribution server at the first node and a second update command to the second distribution server at the second node, wherein the second remote endpoint handles a command type of the first update command, the first update command causes the first distribution server to perform an update of the first node with the first bundle, and the first update command comprises the first bundle, and the second update command comprises the second bundle.

2. The method of claim 1, wherein the calculating further comprises:

calculating, by the at least one processor, the first bundle is to be stored at the first node in the first cloud computing environment based on the first level configuration file; and calculating, by the at least one processor, the second bundle is to be stored at the second node in the second cloud computing environment based on the first level configuration file and the second level configuration file, wherein the second level configuration file overrides the first level configuration file.

3. The method of claim 1, wherein the first local state comprises at least one of a version number of the first bundle, a file list of the first bundle, and a hash of the file list of the first bundle.

4. The method of claim 1, wherein the first bundle comprises an interdependent set of code files.

5. The method of claim 1, wherein the transmitting the first update command to the first distribution server at the first node and the second update command to the second distribution server at the second node further comprises:
transmitting, by the at least one processor, the first update command to the first distribution server at the first node based on the first notification.

6. The method of claim 1, further comprising:
in response to the receiving, determining, by the at least one processor, that the first bundle and the second bundle are on a staged list representing bundles capable of being deployed to nodes.

7. The method of claim 1, further comprising:
receiving, by the at least one processor, displayable textual differences between a file in the first bundle and the same file in a corresponding bundle at the first node from the first distribution server at the first node.

8. The method of claim 7, wherein the receiving the displayable textual differences between the file in the first bundle and the same file in the corresponding bundle at the first node from the first distribution server at the first node further comprises:
receiving, by the at least one processor, the displayable textual differences between the file in the first bundle and the same file in the corresponding bundle at the first node based on the first distribution server performing a hash of the first bundle and a hash of the corresponding bundle at the first node.

9. The method of claim 7, wherein the receiving the displayable textual differences between the file in the first bundle and the same file in the corresponding bundle at the first node from the first distribution server at the first node further comprises:
receiving, by the at least one processor, the displayable textual differences between the file in the first bundle and the same file in the corresponding bundle at the first node based on the first distribution server performing a textual comparison between the file in first bundle and the same file in the corresponding bundle at the first node.

10. A system, comprising:
a memory; and
at least one processor coupled to the memory and configured to:
determine a first local state of a first bundle in a file system and a second local state of a second bundle in the file system, wherein an application comprises the first bundle and the second bundle, and the first bundle is stored in a first repository and the second bundle is stored in a second repository;
calculate the first bundle is to be stored at a first node in a first cloud computing environment and the second bundle is to be stored at a second node in a second cloud computing environment based on a first level configuration file and a second level configuration file, wherein the first level configuration file is stored in the file system at a higher hierarchical level than the second level configuration file is stored in the file system;
transmit a first status command to a first remote endpoint of a first distribution server at the first node and a second status command to a second distribution server at the second node, wherein the first remote endpoint handles a command type of the first status command, the first status command causes the first distribution server to perform an automatic difference calculation between the first local state of the first bundle and a first remote state at the first node, and the first status command comprises the first local state of the first bundle, and the second status command comprises the second local state of the second bundle;
in response to the transmitting, receive a first notification from the first distribution server at the first node and a second notification from the second distribution server at the second node, wherein the first notification indicates that the first distribution server determined the first local state of the first bundle is different than the first remote state at the first node, and the second notification indicates that the second distribution server determined the second local state of the second bundle is different than a second remote state at the second node; and
transmit a first update command to a second remote endpoint of the first distribution server at the first node and a second update command to the second distribution server at the second node, wherein the second remote endpoint handles a command type of the first update command, the first update command causes the first distribution server to perform an update of the first node with the first bundle, and the first update command comprises the first bundle and the second update command comprises the second bundle.

11. The system of claim 10, wherein to calculate, the at least one processor is further configured to:
calculate the first bundle is to be stored at the first node in the first cloud computing environment based on the first level configuration file; and
calculate the second bundle is to be stored at the second node in the second cloud computing environment based on the first level configuration file and the second level configuration file, wherein the second level configuration file overrides the first level configuration file.

12. The system of claim 10, wherein the first local state comprises at least one of a version number of the first bundle, a file list of the first bundle, and a hash of the first bundle.

13. The system of claim 10, wherein the first bundle comprises an interdependent set of code files.

14. The system of claim 10, wherein to transmit the first update command to the first distribution server at the first node and the second update command to the second distribution server at the second node, the at least one processor is further configured to:
transmit the first update command to the first distribution server at the first node based on the first notification.

15. A non-transitory computer-readable device having instructions stored thereon that, when executed by at least one computing device, cause the at least one computing device to perform operations comprising:
determining a first local state of a first bundle in a file system and a second local state of a second bundle in the file system, wherein an application comprises the first bundle and the second bundle, and the first bundle is stored in a first repository and the second bundle is stored in a second repository;

calculating the first bundle is to be stored at a first node in a first cloud computing environment and the second bundle is to be stored at a second node in a second cloud computing environment based on a first level configuration file and a second level configuration file, wherein the first level configuration file is stored in the file system at a higher hierarchical level than the second level configuration file is stored in the file system;

transmitting a first status command to a first remote endpoint of a first distribution server at the first node and a second status command to a second distribution server at the second node, wherein the first remote endpoint handles a command type of the first status command, the first status command causes the first distribution server to perform an automatic difference calculation between the first local state of the first bundle and a first remote state at the first node, and the first status command comprises the first local state of the first bundle, and the second status command comprises the second local state of the second bundle;

in response to the transmitting, receiving a first notification from the first distribution server at the first node and a second notification from the second distribution server at the second node, wherein the first notification indicates that the first distribution server determined the first local state of the first bundle is different than the first remote state at the first node, and the second notification indicates that the second distribution server determined the second local state of the second bundle is different than a second remote state at the second node; and transmitting a first update command to a second remote endpoint of the first distribution server at the first node and a second update command to the second distribution server at the second node, wherein the second remote endpoint handles a command type of the first update command, the first update command causes the first distribution server to perform an update of the first node with the first bundle, and the first update command comprises the first bundle and the second update command comprises the second bundle.

16. The non-transitory computer-readable device of claim 15, wherein the calculating further comprises:

calculating the first bundle is to be stored at the first node in the first cloud computing environment based on the first level configuration file; and calculating the second bundle is to be stored at the second node in the second cloud computing environment based on the first level configuration file and the second level configuration file, wherein the second level configuration file overrides the first level configuration file.

17. The non-transitory computer-readable device of claim 15, wherein the first local state comprises at least one of a version number of the first bundle, a file list of the first bundle, and a hash of the first bundle.

18. The non-transitory computer-readable device of claim 15, wherein the transmitting the first update command to the first distribution server at the first node and the second update command to the second distribution server at the second node further comprises:

transmitting the first update command to the first distribution server at the first node based on the first notification.

* * * * *